United States Patent [19]

(12) United States Patent
Christensen et al.

(10) Patent No.: US 8,422,090 B2
(45) Date of Patent: Apr. 16, 2013

(54) IMAGE CAPTURE OF SUBJECT REGION AND CONTROL REGION

(75) Inventors: K Trent Christensen, Boise, ID (US); Dean J. Richtsmaier, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 332 days.

(21) Appl. No.: 12/892,583

(22) Filed: Sep. 28, 2010

(65) Prior Publication Data

US 2012/0075679 A1    Mar. 29, 2012

(51) Int. Cl.
*H04N 1/04* (2006.01)

(52) U.S. Cl.
USPC ............ 358/474; 358/448; 358/475; 358/498

(58) Field of Classification Search .................. 358/474, 358/448, 475, 498, 497
See application file for complete search history.

(56) References Cited

U.S. PATENT DOCUMENTS

| 7,051,281 | B1 * | 5/2006 | Yokota | 715/740 |
| 7,543,940 | B2 | 6/2009 | Wu et al. | |
| 7,936,925 | B2 * | 5/2011 | Martin et al. | 382/175 |
| 2007/0183688 | A1 * | 8/2007 | Hollfelder | 382/305 |
| 2009/0232398 | A1 | 9/2009 | Martin et al. | |
| 2010/0073205 | A1 | 3/2010 | Sie | |

OTHER PUBLICATIONS

Ahmad Allan, Pranav Mistry: The thrilling potential of SixthSense technology, website video clip http://www.ted.com/talks/pranav_mistry_the_thrilling_potential_of_sixthsense_technology.html, Video Clip 6:55-7:07, publication date Apr. 5, 2010.
Arik Hesseldahl, Typing on the Table, , Website http://www.forbes.com/2002/09/18/0918tentech.html; publication date Sep. 18, 2002.

* cited by examiner

*Primary Examiner* — Houshang Safaipour

(57) ABSTRACT

A device includes a processing system having a processor and a memory and an image capture component coupled to the processing system. The image capture component is configured to receive an image of a subject region within a field of view and an image of a control region within the field of view. The processing system is configured to process the image of the control region as a user input for processing the image of the subject region.

20 Claims, 4 Drawing Sheets

IMAGE CAPTURE OF SUBJECT REGION AND CONTROL REGION

BACKGROUND

Printers, scanners, copiers, and fax machines perform corresponding processes as stand alone devices or as devices coupled to computers or networks. Two or more processes of printing, scanning, copying, and faxing can be incorporated into a single device, which is often referred to as a Multifunction Product (MFP), or an All-In-One device (AIO). MFP can include both stand alone devices and computer peripherals. MFPs are particularly popular because they save on the expense of purchasing and using separate devices to perform the processes and often save space over the space used by the separate devices. Additionally, MFPs save on the expense of multiple network or wireless connections, and can often reduce the total amount of power consumed by separate peripherals. MFPs take advantage of using many of the same components for different processes.

As components become easier to manufacture, their cost tends to drop in price. More features, improved features, or both can be included in a new MFP for the same or lower cost of a current MFP, or a new MFP can include the same features as a current generation MFP for lower cost. These cost reductions often result from manufacturing efficiencies in both the components and the MFPs, design improvements in the known components, or a combination of the two. As MFP technology matures, however, these cost reductions tend to reduce in rate yet consumers still desire devices with improved or additional features for the same or lower cost.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

Figure 1:
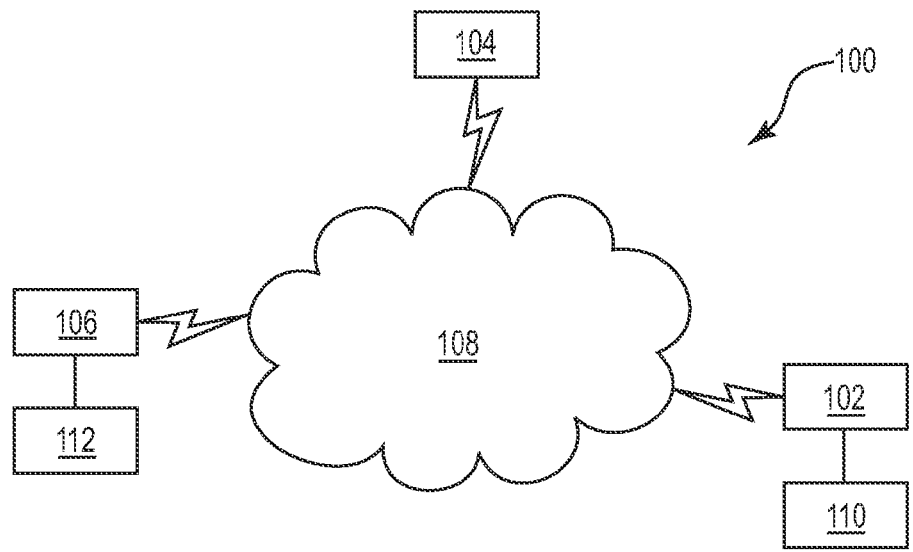
FIG. 1 is a schematic diagram illustrating an example environment of the present disclosure.

FIG. 1 illustrates an embodiment of an environment 100 including at least one device 102, such as an MFP or AIO, that can perform one or more processes of printing, scanning, copying, and faxing. One example of an MFP includes at least printing, scanning, and copying processes. In one example, the device 102 can be a stand alone system, which operates without coupling to another device or a network. In the illustrated example, however, device 102 can communicate with one or more computing devices 104, 106. Examples of computing devices 104, 106 can include a general purpose computer, server, handheld device, or a consumer electronic device (such as video game console, digital camera, mobile phone, or the like). In one example, device 102 communicates with computing devices 104, 106 over a network 108, such as a local area network or the Internet, but the network can also include a public switched telephone network, or other. Device 102 can also include interfaces for directly coupling to computing device 110 or digital storage media. The environment 100 also includes device 112 that, for example, can be used as a computer peripheral and can be directly coupled to computing device 106 through such interfaces as a universal serial bus USB or parallel connections. Many peripherals 112 provide one or more direct coupling interfaces as well as a network connection interface. Computing device 106 may also be coupled to the network 108 and allow peripheral 112 to communicate with computing device 104 or peripheral 102.

Figure 2:
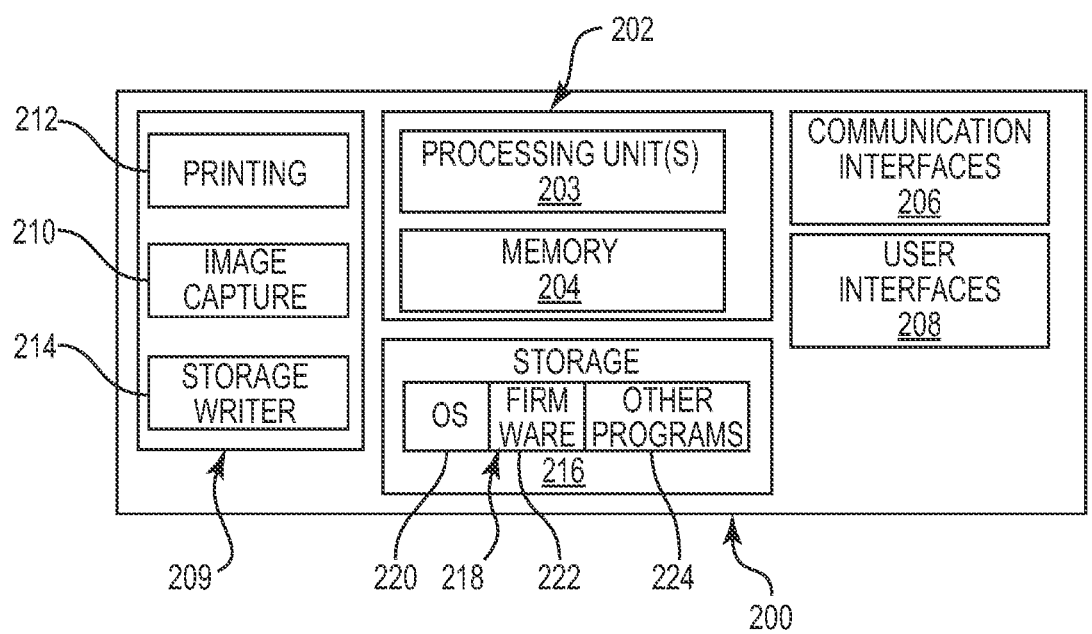
FIG. 2 is a block diagram illustrating an embodiment of a device of FIG. 1.

FIG. 2 illustrates an embodiment of a device 200 having a set of general components, where the device 200 can include features of devices 102 and 112. In an example configuration, device 200 includes a processing system 202 having one or more processing units 203 and a memory 204. The processing units 203 can be general microprocessors or can be specifically designed for the device 200. The memory 204 is often volatile, but can include nonvolatile memory or some combination of the two. Device 200 can also include one or more communication interfaces 206 for receiving and/or sending data over a network, or with other connections such as USB, to peripherals, computing devices, and storage mediums such as memory cards, flash drives, optical discs, or other forms removable memory. A user interface 208 is included that can include devices or systems for user inputs to activate the device 200, cause a processes to start or stop, indicate parameters for a process, or the like.

The device 200 includes one or more input/output devices 209 used for performing the processes such as printing, scanning, copying, and/or faxing. The input/output devices 209 can include an image capture device 210 and can also include a print device 212. An MFP generally includes both image capture and print devices 210, 212. The image capture device 210 and can include at least an image sensor, such as a charged coupled device (CCD) or an active pixel sensor (such as a complementary metal-oxide semiconductor, or CMOS, sensor). The image capture device 210 can also include a device to illuminate a document or article to help improve imaging quality and a device to position the document or article so it can be imaged. The printing device 212 can be included to mark characters or images on an article such as a piece of paper. The printing device 212 can include a printing mechanism, such as print heads, and handler to present the article to the printing mechanism. Another input/output device included on device 200 is a storage medium writer 214, such as a digital versatile disc (DVD) writer or the like.

The device 200 also includes a storage medium 216 having applications 218 to be run in the processing system 202 for controlling the components of the device 200. The storage medium 216 is often a nonvolatile read/write storage medium such as a magnetic disk drive or flash device. Storage medium 216 includes applications 218 such as an operating system 220, firmware 222, and/or other programs 224. Applications 218 often come preloaded with the device 200, but can often accept firmware updates or other changes. Applications 218 can control the processes, enhance the processes, interface with the user, and the like. For example the applications can be used for file conversion, optical character recognition, and message and user interface controls. The operating system 220 can be a specialized operating system or, at times, a general computer operating system such as a Unix-based operating system. A user may be able to download additional applications to suit particular needs.

The device 200 can include addition components, such as containers for papers of different sizes, automatic document feeders, collators, and devices to enable automatic copying or scanning from both sides of the document or copying to both sides of a piece of paper.

As components and functions become easier to manufacture, the cost of the components tends to drop in price. As a technology matures, however, these cost reductions tend to reduce in rate. For example, the user interface 208 often includes a control panel for operation and selecting or changing the settings of device 200. Often, these control panels include a liquid crystal display (LCD), associated drivers, buttons dedicated to a function, soft buttons, a printed circuit board, and other associated hardware. Much of these technologies are mature, and the rate of cost reduction is reduced and possibly approaching a lower limit. This hardware also affects size, weight, and complexity of the device 200, which can negatively affect costs.

Figure 3:
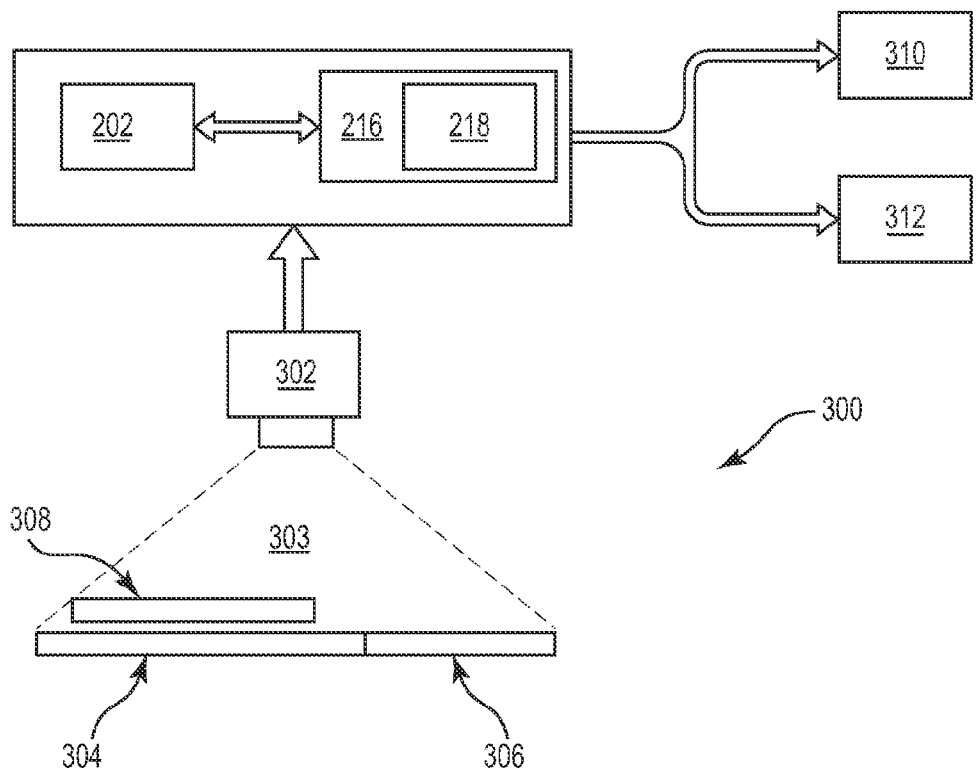
FIG. 3 is a block diagram illustrating an embodiment of the device of FIG. 2.

FIG. 3 shows an embodiment of a simplified device 300 including at least some of the features of device 200. The device 300 includes an image capture component 302 (which can include features of the image capture device 210 above) that is configured to receive images in a field of view 303 from a subject region 304 and a control region 306. The processing system 202 and one or more applications 218 stored in the storage medium 216 operate to receive an image of a subject (such as a document) 308 imaged from the subject region 304. In one example, the received image can be used to create an electronic version or file 310 of the subject 308. Additionally, the processing system 202 and one or more applications 218 operate to receive and process images or changes in the control region 306 as user inputs 312 to the device 300. For example, the device 300 can receive an image of a document 308 placed in the subject region 304 with the image capture component 302. The peripheral 300 creates an electronic file 310 of an image of the document 308 in a memory, such as memory 204, and that electronic file 310 can be transferred to a computing device, such as computing devices 104 or 106 of FIG. 1. Changes detected in the image from the control region 306 are also presented to the processor system 202 and one or more applications 218, which then configure the device 300 to operate as at least one of a scanner or copier, or to perform other functions of the device 300.

Figure 4:
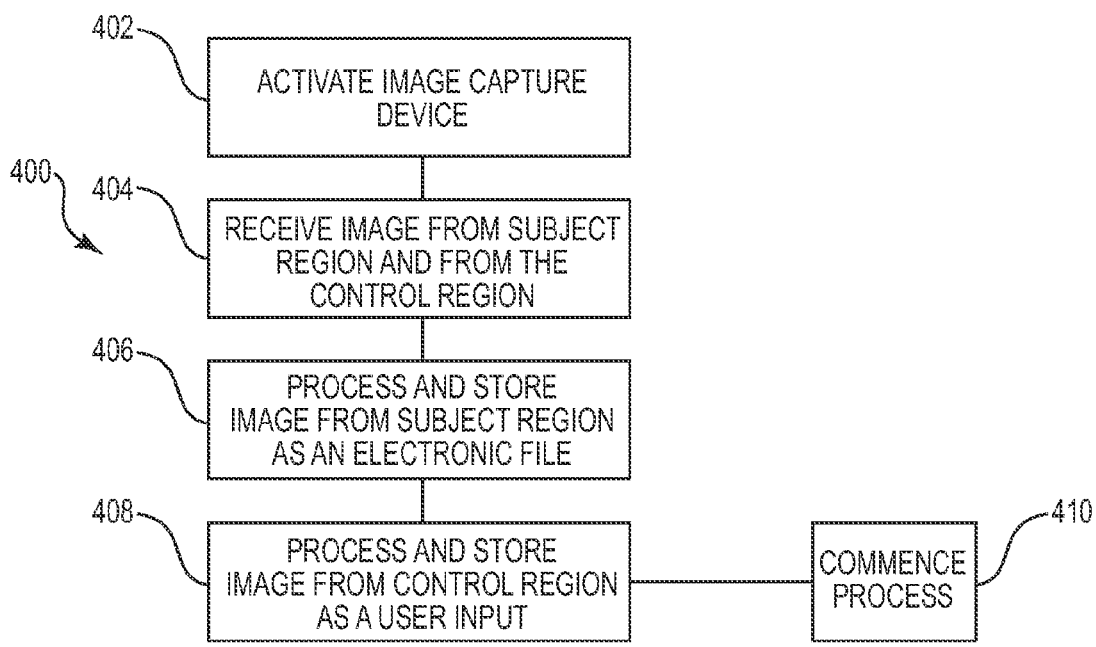
FIG. 4 is a block diagram illustrating an embodiment of a method, such as a method for use with the device of FIG. 3.

FIG. 4 illustrates an embodiment of a method 400 that can be used with the device 300 described above. The image capture component 302 is activated at 402. This can be done by switching the device 300 to an on state, detecting the presence of an object in the field of view 303, or some other way. The image capture component 302 receives an image from the subject region 304 and the control region 306 at 404. In receiving the image from the subject region 304, the image capture device 302 can take a snap shot of the subject, such as document 308. The image received from the subject region 304 can be processed and converted to the electronic file 310 at 406. For example, the image received from the subject region 304 can be automatically processed with image processing software and converted into a default or selected form of an electronic file format stored in the processing system 202 (such as memory 204) or storage 216 of the device 300.

The image received in the control region 306 is also processed and analyzed to determine user inputs at 408. User inputs can be provided by changes in a selected region of the control region 306. For example, the image processing at 408 can determine that an object in the shape of a finger has entered the control region 306. Depending on the configuration of input control imaging software of applications 218, this can indicate that a user wishes to print the image stored in the electronic file at 406, or activate a copy process of the device 300. An object detected in another portion of the control region 306 may increase or reduce an amount of copies desired from the device 300. According to the user inputs at 408, the device 300 will commence one or more corresponding processes at 410.

Figure 5:
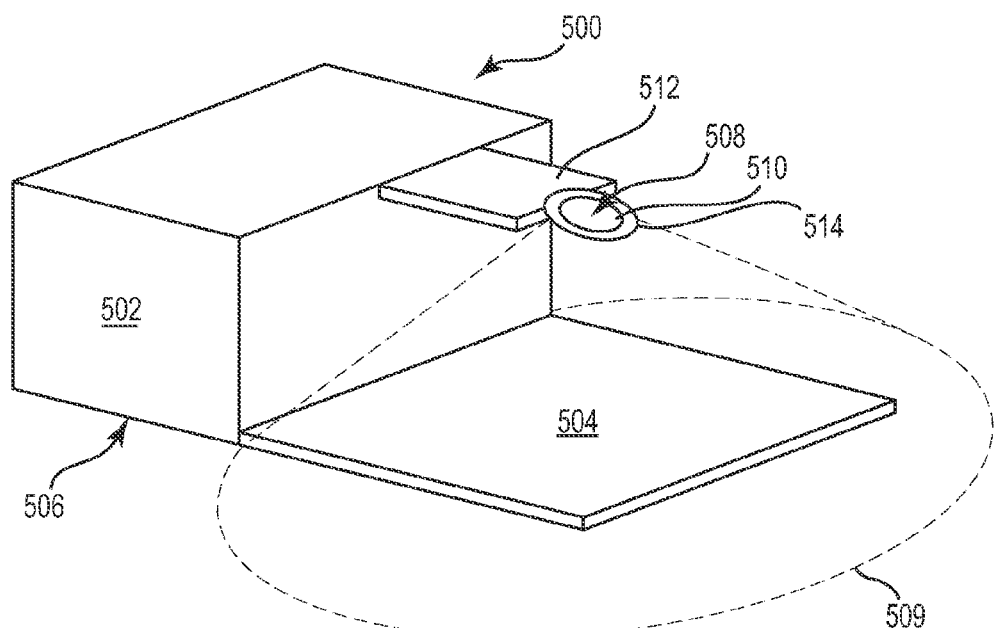
FIG. 5 is a schematic diagram illustrating an example embodiment of the device of FIG. 3.

FIG. 5 is a perspective view illustrating an embodiment of device 500, such as an MFP for example, incorporating features of the device 300. The MFP 500 can be integrated into a single unit. For example, the single unit MFP 500 can include housing 502 that contains many of components for performing the selected processes such as communication interface hardware, a printing component, processors, and the like described above in FIG. 2. The MFP 500 also includes a platen 504 extending laterally from near a first side 506 of the housing 502 and an image capture component 508. One or both of the platen 504 and the image capture component 508 can be affixed to housing 502, configured to slide within the dimensions of the housing 502 when not in use, or otherwise be movable or capable of being disassembled.

The platen 504 of the example is generally planar. In one example, the platen 504 is a tray suitable for accepting a subject desired to be scanned, copied, faxed, e-mailed, or on the like. In one embodiment, the platen 502 is a tray that remains generally rigid under the force of a subject placed on it and is larger in area than the largest area the MFP 500 is designed to scan. For example, if the MFP 500 is designed to scan or copy documents up to 11 inches in width and 14 inches in length, the dimensions of the platen 504 can be 12 inches in width and 16 inches in length.

The image capture component 508 is disposed in a manner such that at least a portion of the platen 504 is within its field of view 509. In the example shown, the image capture component 508 includes an image detector 510 disposed on an extended arm 512 coupled to the housing 502. In one example, the extended arm 512 can include a printer output tray (not shown). The image detector 510 is shown disposed in a plane spaced-apart from and generally parallel to the platen 504. Other positions of the image detector 510 relative to the platen 504 are contemplated. For example, one set of configurations includes positions where the image detector 510 is not in generally the same plane of the platen 504. In one example, the image detector 510 includes a photodetector such as a CCD, a CMOS sensor, thin-film transistor (TFT) sensor, or other active pixel sensor, or another sensor suitable for detecting images. The image detector 510 can also include a translucent lens, such as a transparent lens, disposed proximate to the photodetector to adjust the field of view to include at least a large portion of the platen 504. The image capture component 508 can also include illumination devices 514 disposed proximate the image detector 510 to illuminate the field of view 509. Illumination devices 514 can include light emitting diodes (LEDs). Illumination devices 514 can be used to illuminate the subject region 304 or both the subject region 304 and control region 306 concurrently.

Figure 6:
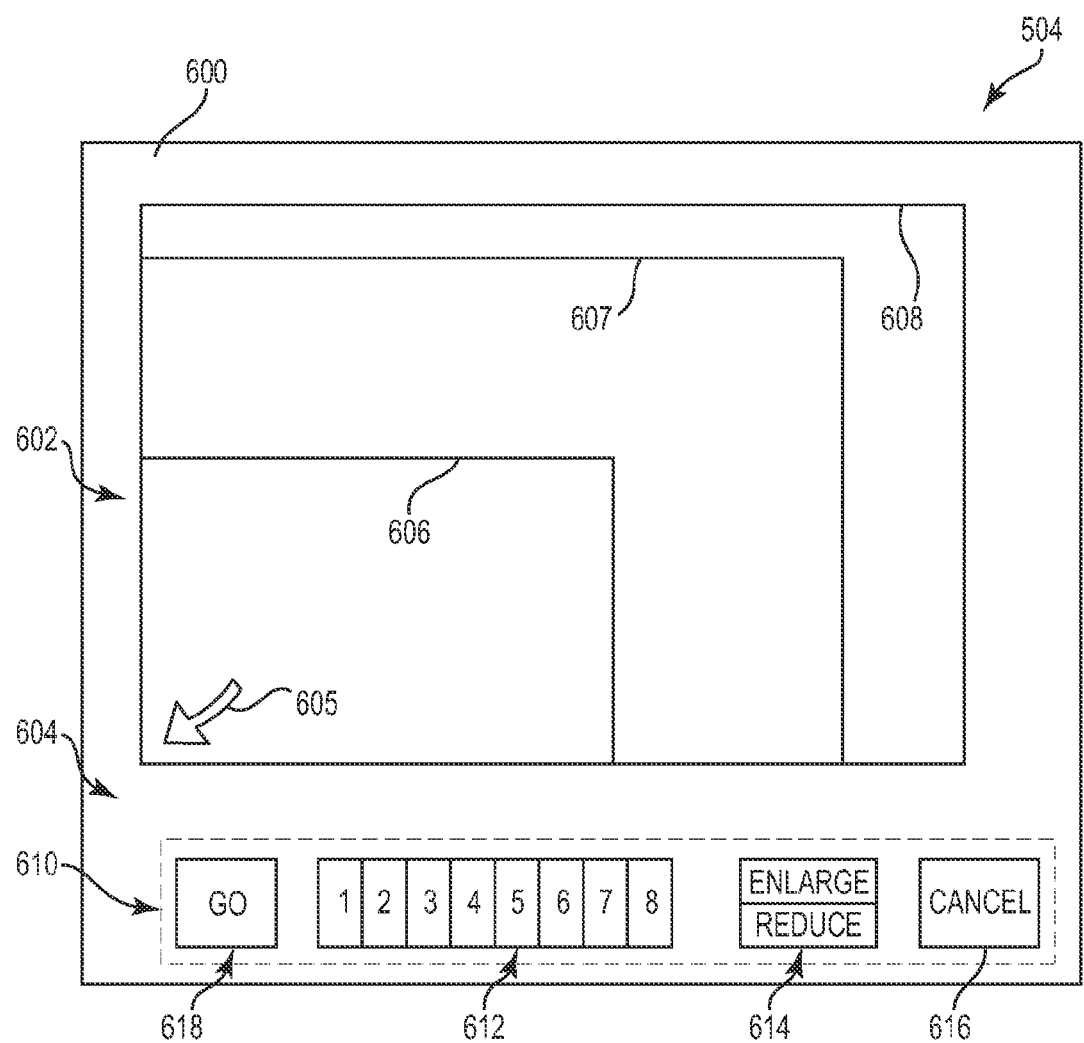
FIG. 6 is a schematic diagram illustrating an example embodiment of a feature of the device of FIG. 5.

FIG. 6 is a plan view illustrating an example working surface 600 of the platen 504 as viewed from the image capture component 508. In this example, documents 308 or articles are placed on the working surface 600 where the side of the document intended to be imaged faces the image capture component 508. In the example shown, the working surface 600 includes a region 602 for placing documents to be imaged. Region 602 is within the field of view 509 of the image capture device 508. More particularly, region 602 in this example is included within the subject region 304 described above. The region 602 can include indicia 604 to indicate the proper positions of the document to be imaged. For example, indicia 604 can include an arrow and a label 605 directing the user to "Place Corner Here." Additionally, or alternatively, the working surface 600 can include outlines of various document sizes, such as 5 by 7 at 606, 8×10 at 607, 8.5 by 11 at 608. The indicia 604 can be printed on the platen 504, such as screen printed, molded in the platen, etched into the platen, or otherwise marked on the platen.

The working surface 600 also includes indicia 604 in region 610 within the field of view 509. Region 610 in this example is included within the control region 306 as described above. In this example, region 610 can include virtual buttons or control in region 612 for selecting the number of copies, region 614 to enlarge or reduce the image, region 616 to cancel or reset options, region 618 to begin a process such as a "Go" button. In this example, a user can touch one of the regions 612, 614, 616, 618 and the changes in the image of these regions are detected during processing of the image, which applies selected user inputs. In one example, the image processing of the region 610 can detect the presence of an object the shape of a finger or similar, that the indicia 604 in region 610 is covered. In another example (not shown), region 610 can include mechanical dials or sliders that can be set to display selected indicia, such as turning a dial to show a "5" to indicate five copies are desired. At the input of a "go" button, the image processing can read the indicia displayed by the dials or sliders and perform the selected user input. The region 610 can include some or the entire user input controls for the MFP 500. In one example, the MFP 500 can include an LED or speaker (not shown) or similar to illuminate, make a sound, or otherwise indicate that the user input was received in the MFP 500.

Figure 7:
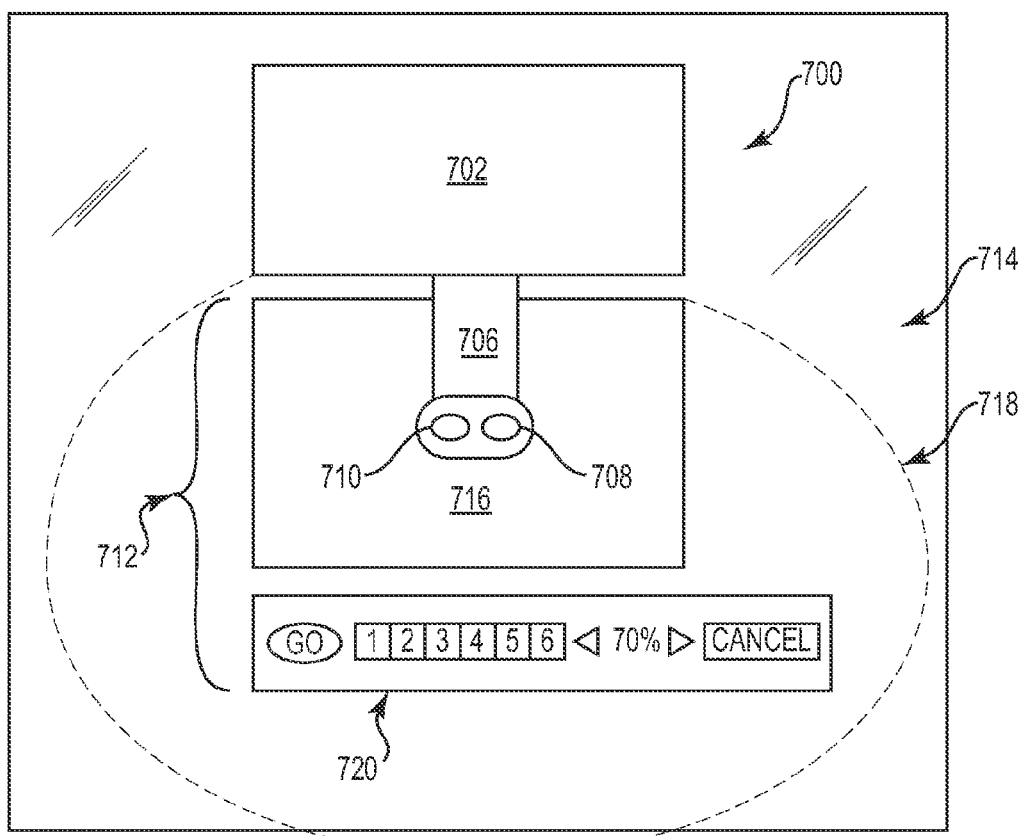
FIG. 7 is a schematic diagram illustrating another example embodiment of the device of FIG. 3.

FIG. 7 is a top plan view illustrating an embodiment of an device 700, such as an MFP for example, also incorporating features of the device 300 and sharing many of the features of device 500. The MFP 700 can include housing 702 that contains many of components for performing the selected processes such as communication interface hardware, a printing component, processors, and the like described above in FIG. 2. The MFP 700 also includes an extending arm 706 coupled to an image capture component 708 and an image projection component 710.

The image projection component 710 projects a virtual control panel 712 onto the platen coupled to an MFP or, in the case of the illustrated example, onto a surface 714 detached from the MFP 700 such as desk top, table top, wall, or the like. In one example, the virtual control panel 712 is a holographic image. The virtual control panel 712 can be used instead of all or part of the indicia 604 marked on the platen 504 in MFP 500. The virtual control panel 712 can include a region 716 to place documents to be scanned or copied and otherwise define a subject region 304 in the field of view 718. The virtual control panel 712 can also include virtual buttons 720 in a control region 306 of the field of view 718. The image capture component 708 can receive images of documents in the region 716 and receive images to detect inputs from the virtual buttons 720.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device, comprising:
   a processing system having a processor and a memory; and
   an image capture component coupled to the processing system and configured to receive an image of a subject region within a field of view and an image of a control region within the field of view;
   wherein the processing system is configured to process changes occurring in the image of the control region during operation of the image capture component as a user input for processing the image of the subject region.

2. The device of claim 1 wherein the processing system is configured to process the image from the control region as a user input to the processing system, and wherein the processing system is also configured to print, scan, copy and/or fax the image of the subject region.

3. The device of claim 1, further comprising an illumination device for illuminating the subject region and the control region.

4. The device of claim 1, wherein the illumination device concurrently illuminates the subject region and the control region.

5. The device of claim 1 wherein the processing system and the image capture device are integrated into a single device.

6. The device of claim 5 wherein the single device further includes a communication interface and an application stored in a storage medium.

7. The device of claim 5 and further including a platen coupled to the single device and within at least a portion of the field of view.

8. The device of claim 7 wherein the platen has a generally planar working surface opposing the image capture device.

9. The peripheral of claim 8 wherein the subject region and the control region are within the working surface and the platen.

10. The peripheral of claim 7 wherein the platen includes a first set of indicia for indicating document positioning in the subject portion and a second set of indicia indicating virtual controls in the control region.

11. The device of claim 5 and further comprising an image projection device for projecting a virtual image on a surface, wherein the virtual image is within the field of view.

12. The device of claim 11 wherein the virtual image defines proper document position in the subject portion and virtual controls in the control region.

13. The device of claim 11 wherein the virtual image includes a holographic image.

14. A method for use with an image capture component, comprising:

receiving a subject image from within a field of view of the image capture component;

receiving a control image from within the field of view;

detecting changes occurring in the control image during operation of the image capture component; and processing the changes occurring in the control image as a user input for printing, scanning, copying, and/or faxing the subject image.

15. The method of claim 14 comprising activating an image capture device for receiving the subject image and the control image.

16. The method of claim 14 comprising detecting multiple images from within the control image and processing each of the multiple images as a separate user control.

17. The method of claim 14 wherein the processing includes copying and the user inputs include selecting an amount of copies.

18. The method of claim 14 wherein receiving the control image includes detecting an image having a selected shape introduced into the control image.

19. A multifunction device, comprising:

a processing system having a processor and a memory;

a printing device operably coupled to the processing system;

a communication interface operably coupled to the processing system;

an image capture component coupled to the processing system and configured to receive an image of a subject region within a field of view of the image capture component and an image of a control region within the field of view; and a virtual control panel disposed within the control region;

wherein the processing system is configured to process changes occurring in the image of the control region during operation of the image capture component as a user input for printing, scanning, copying and/or faxing the image of the subject region.

20. The multifunction device of claim 19 and further including a platen configured as the virtual control panel.

* * * * *

UNITED STATES PATENT AND TRADEMARK OFFICE
CERTIFICATE OF CORRECTION

PATENT NO. : 8,422,090 B2
APPLICATION NO. : 12/892583
DATED : April 16, 2013
INVENTOR(S) : K Trent Christensen et al.

Page 1 of 1

It is certified that error appears in the above-identified patent and that said Letters Patent is hereby corrected as shown below:

On the Title page, in item (75), Inventors, in column 1, line 2, delete "Richtsmaier," and insert -- Richtsmeier, --, therefor.

Signed and Sealed this
Thirteenth Day of August, 2013

Teresa Stanek Rea
*Acting Director of the United States Patent and Trademark Office*